(12) United States Patent
Lin

(10) Patent No.: US 9,969,306 B1
(45) Date of Patent: May 15, 2018

(54) FOLDABLE CAR SEAT

(71) Applicant: Shanghai Woyoo Electronic Technology Co., Ltd, Shanghai (CN)

(72) Inventor: Hao Lin, Shanghai (CN)

(73) Assignee: Shanghai Woyoo Electronics Technology Co., Ltd., Shanghai (CN)

( * ) Notice: Subject to any disclaimer, the term of this patent is extended or adjusted under 35 U.S.C. 154(b) by 86 days.

(21) Appl. No.: 15/117,636

(22) PCT Filed: May 19, 2016

(86) PCT No.: PCT/CN2016/082593
§ 371 (c)(1),
(2) Date: Aug. 9, 2016

(87) PCT Pub. No.: WO2017/173711
PCT Pub. Date: Oct. 12, 2017

(30) Foreign Application Priority Data

Apr. 7, 2016 (CN) .......................... 2016 1 0214003

(51) Int. Cl.
*B60N 2/26* (2006.01)
*B60N 2/28* (2006.01)
*B60N 2/30* (2006.01)

(52) U.S. Cl.
CPC .............. *B60N 2/3011* (2013.01); *B60N 2/28* (2013.01)

(58) Field of Classification Search
CPC ................................ B60N 2/28; B60N 2/3011
USPC ............ 297/16.1, 16.2, 17, 250.1, 253, 255, 297/256.16, 354.11, 378.1, 378.12, 297/378.14
See application file for complete search history.

(56) References Cited

U.S. PATENT DOCUMENTS

| | | | | |
|---|---|---|---|---|
| 4,902,070 A | * | 2/1990 | Casale | A47C 13/00 |
| | | | | 297/378.12 X |
| 5,052,748 A | * | 10/1991 | Fourrey | B60N 2/20 |
| | | | | 297/378.12 X |
| 5,123,377 A | * | 6/1992 | Edwards | A01K 1/0272 |
| | | | | 297/255 X |
| 5,158,337 A | * | 10/1992 | Leggett | B60N 2/20 |
| | | | | 297/250.1 |
| 5,435,624 A | * | 7/1995 | Bray | B60N 2/0232 |
| | | | | 297/378.1 X |
| 5,997,090 A | * | 12/1999 | Baloche | B60N 2/0284 |
| | | | | 297/362.12 |

(Continued)

*Primary Examiner* — Rodney B White
(74) *Attorney, Agent, or Firm* — Wang Law Firm, Inc.

(57) ABSTRACT

A foldable car seat includes a base frame having a driver securely mounted thereon, a sliding frame operably connected to the driver and slidably attached to the base frame and having an adapter securely attached to a free end of the sliding frame so that the base frame is able to move relative to the sliding and a back frame foldably connected to the base frame and consisting of a pair of lower support frames foldably connected to free ends of the base frame through a first folding device and a pair of upper support frames foldably connected to free ends of the pair of lower support frames through a second folding device. The pair of lower support frames is foldable relative to the base frame and the pair of upper support frames is foldable relative to the pair of lower support frames. A locking mechanism is provided to the sliding frame to limit movement extent of as well as to position location of the sliding frame relative to the base frame.

8 Claims, 15 Drawing Sheets

(56) References Cited

U.S. PATENT DOCUMENTS

| | | | | |
|---|---|---|---|---|
| 6,076,890 A * | 6/2000 | Yoshida | B60N 2/206 297/378.12 X |
| 6,082,818 A * | 7/2000 | Muller | B60N 2/28 297/250.1 |
| 6,139,104 A * | 10/2000 | Brewer | B60N 2/20 297/378.12 X |
| 6,402,250 B1 * | 6/2002 | Lange | B60N 2/20 297/378.12 |
| 6,447,066 B1 * | 9/2002 | Chabanne | B60N 2/235 297/378.12 X |
| 6,464,299 B1 * | 10/2002 | Castagna | B60N 2/206 297/378.12 |
| 6,513,876 B1 * | 2/2003 | Agler | B60N 2/206 297/378.12 |
| 6,685,266 B2 * | 2/2004 | James | B60N 2/2812 297/250.1 |
| 6,739,668 B2 * | 5/2004 | Coman | B60N 2/206 297/378.12 |
| 6,908,151 B2 * | 6/2005 | Meeker | B60N 2/2806 297/250.1 |
| 6,910,739 B2 * | 6/2005 | Grable | B60N 2/2354 297/378.1 X |
| 7,025,422 B2 * | 4/2006 | Fast | B60N 2/206 297/378.14 |
| 7,097,253 B2 * | 8/2006 | Coughlin | B60N 2/206 297/378.12 X |
| 7,114,779 B2 * | 10/2006 | Thiel | B60N 2/206 297/378.12 |
| 7,229,132 B2 * | 6/2007 | Meeker | B60N 2/2806 297/250.1 |
| 7,303,230 B2 * | 12/2007 | Munn | B60N 2/20 297/255 |
| 7,364,237 B2 * | 4/2008 | Grable | B60N 2/20 297/378.1 X |
| 7,380,878 B2 * | 6/2008 | Clement | B60N 2/2806 297/255 |
| 7,419,217 B2 * | 9/2008 | Ishizuka | B60N 2/236 297/378.1 X |
| 7,475,941 B2 * | 1/2009 | Clement | B60N 2/2806 297/255 |
| 7,547,066 B2 * | 6/2009 | Mendenhall | B60N 2/28 297/16.1 |
| 7,740,309 B2 * | 6/2010 | Mayercheck | A47C 4/14 297/16.1 |
| 7,758,120 B2 * | 7/2010 | Zink | B60N 2/2866 297/250.1 |
| 7,758,124 B2 * | 7/2010 | Kojima | B60N 2/236 297/378.12 X |
| 7,823,974 B2 * | 11/2010 | Mendenhall | B60N 2/2866 297/255 X |
| 7,837,267 B2 * | 11/2010 | Zink | B60N 2/2866 297/250.1 |
| 7,845,726 B2 * | 12/2010 | Mendenhall | B60N 2/2866 297/250.1 |
| 7,857,385 B2 * | 12/2010 | Zink | B60N 2/2851 297/250.1 |
| 8,113,589 B2 * | 2/2012 | Mildt | B60N 2/20 297/378.12 X |
| 8,152,236 B1 * | 4/2012 | Romero | A47D 15/006 297/16.1 |
| 8,172,322 B2 * | 5/2012 | Chen | B62B 7/123 297/250.1 |
| 8,182,034 B2 * | 5/2012 | Glance | B60N 2/2866 297/16.1 |
| 8,240,762 B2 * | 8/2012 | Herzberg | B60N 2/01 297/256.16 X |
| 8,366,192 B2 * | 2/2013 | Clement | B60N 2/2821 297/253 X |
| 8,454,089 B2 * | 6/2013 | Nett | B60N 2/2887 297/253 |
| 8,465,096 B2 * | 6/2013 | Sayama | B60N 2/2356 297/378.1 X |
| 8,567,866 B2 * | 10/2013 | Carimati Di Carimate | A47D 1/008 297/378.1 X |
| 8,702,170 B2 * | 4/2014 | Abraham | B60N 2/0825 297/378.1 X |
| 8,899,683 B2 * | 12/2014 | Ito | B60N 2/1615 297/354.11 |
| 9,016,781 B2 * | 4/2015 | Cheng | B60N 2/2821 297/256.16 X |
| 9,016,791 B2 * | 4/2015 | Flucht | B60N 2/206 297/378.1 |
| 2002/0074840 A1 * | 6/2002 | Nakagawa | B60N 2/2821 297/256.16 |
| 2004/0056523 A1 * | 3/2004 | Grable | B60N 2/0284 297/378.12 |
| 2008/0224516 A1 * | 9/2008 | Vegt | B60N 2/2824 297/256.16 |
| 2013/0200672 A1 * | 8/2013 | Mo | B60N 2/2821 297/256.16 |
| 2013/0307305 A1 * | 11/2013 | Guo | B60N 2/2821 297/256.16 |
| 2014/0354021 A1 * | 12/2014 | Sedlack | B60N 2/2821 297/256.16 X |
| 2015/0048660 A1 * | 2/2015 | Hou | B60N 2/2821 297/256.16 |
| 2015/0048661 A1 * | 2/2015 | Hou | B60N 2/2827 297/256.16 |

* cited by examiner

FOLDABLE CAR SEAT

BACKGROUND OF THE INVENTION

The present invention relates to a foldable car seat and, more particularly, to a foldable car seat which is able to be completely folded for storage when not in use.

PRIOR ART DESCRIPTION

Current commercially available child safety seat is targeted to infant or children under age who are legally regulated to put on a safety seat when boarding a vehicle. Normally, the safety seat is positioned at the backseat with the safety belt so that the user (children under age) is able to use it readily. However, due to the bulky design and massive volume the safety seat takes, there is not much room left for other use. Often in time, the driver needs to take it out of the vehicle to clear the backseat so that the driver is able to have room in the back to have extra load such as grocery and/or passengers and when the baby it about to be boarded on the vehicle, the driver will have to strap the safety seat back on again. The on-and-off of the safety seat is quite troublesome and tiresome even though there are all kinds of handy designs on the safety seat to facilitate the driver to carry it around. None of the existing designs enable the driver to fold the car seat completely for storage or to clear the room for extra load.

In order to mitigate the shortcomings from the currently existing safety seat, it is an objective of the preferred embodiment of the present invention to provide a foldable and thus compact car seat so that there is no need to remove the car seat out of the vehicle when the presence of the car seat function inside the vehicle matters none.

BRIEF SUMMARY OF THE INVENTION

An objective of the present invention is to provide a foldable car seat which is compact when folded.

In order to accomplish the objective of being compact, there is provided with a base frame, a back frame, a first folding device sandwiched between the base frame and the back frame to allow the back frame to fold relative to the base frame and a second folding device sandwiched in between elements of the back frame so that when the back frame is not in use, the back frame is able to be further folded so that the overall volume is even more compact.

A further objective of the preferred embodiment of the present invention is that a driving device is provided to the base frame and a sliding frame is slidably connected to the base frame and operably connected to the driving device to allow the sliding frame to move relative to the base frame to accomplish the purpose of adjusting length of the base frame and providing a comfortable seating for the user.

It is an objective of the preferred embodiment of the present invention to provide a foldable car seat adapted to connect to vehicle seat. The foldable car seat includes a base frame having thereon a driver securely mounted thereon; a sliding frame operably connected to the driver and slidably attached to an inside of the base frame and having an adapter securely attached to a free end of the sliding frame to adapt to the vehicle seat so that the base frame is able to move relative to the sliding frame due to power from the driver; and a back frame foldably connected to the base frame and consisting of a pair of first support frames foldably connected to free ends of the base frame through a first folding device and a pair of second support frames foldably connected to free ends of the pair of first support frames through a second folding device to allow the pair of first support frames to fold relative to the base frame and the pair of second support frames to fold relative to the pair of first support frames.

The present invention will be further described in connection with the accompanying drawings and specific embodiments.

DETAILED DESCRIPTION OF THE INVENTION

The present invention will be described further in connection with the accompanying drawings and specific embodiment(s).

Figure 1:
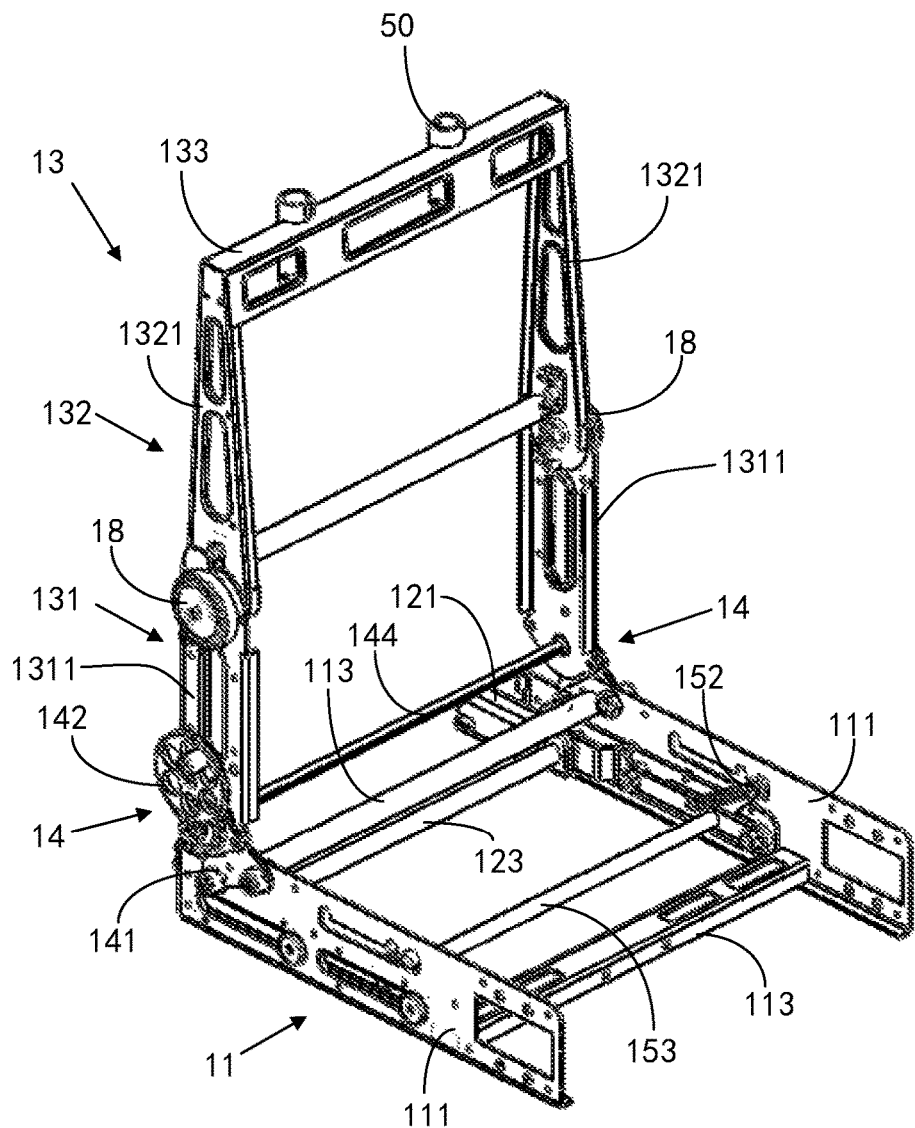
FIG. 1 is a perspective view showing a preferred embodiment of the present invention.
Figure 2:
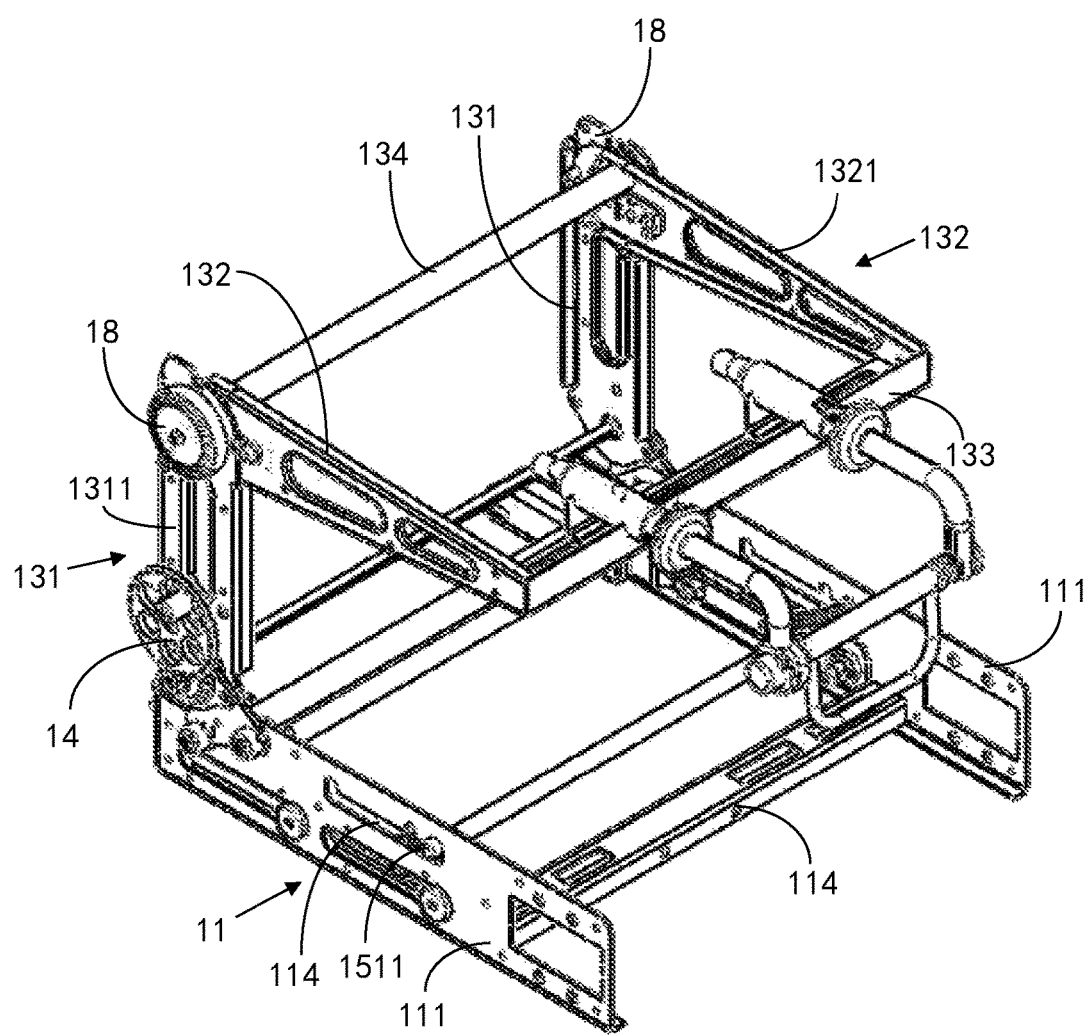
FIG. 2 is still a perspective view of the preferred embodiment of the present invention where the second support frame is folded relative to the first support frame of the back frame.
Figure 3:
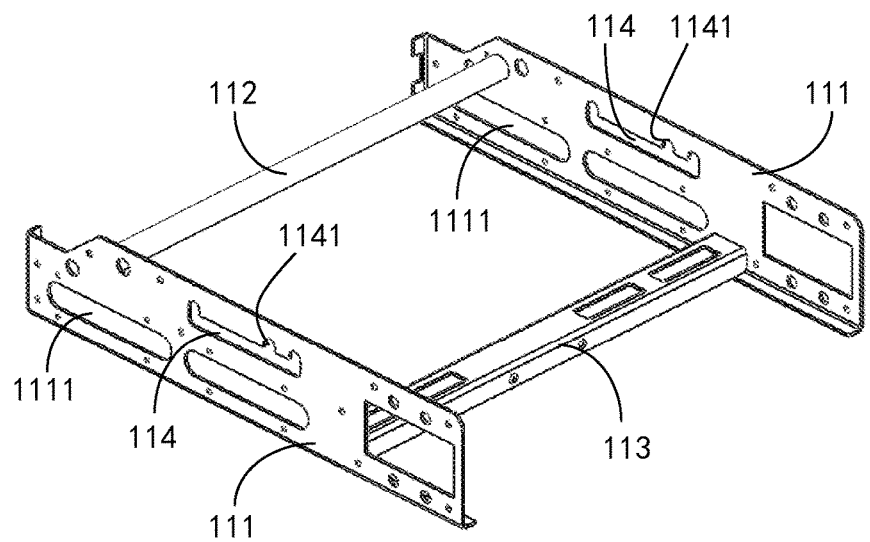
FIG. 3 shows a perspective view of the base frame of the preferred embodiment of the present invention.

With reference to FIGS. 1, 2 and 3, it is to be noted that the foldable car seat constructed in accordance with the present invention includes a base frame 11 and a back frame 13 foldable relative to the base frame 11 with the assistance of a first folding device 14 which is sandwiched between the base frame 11 and bottom of the back frame 13. The base frame 11 has a pair of side plates 111 horizontally located relative to one another and a first connection rod 112 securely connected to a distal end of both the side plates 111 to respectively secure relative locations of the two side plates 111. Still, a support frame 113 is securely provided between the two side plates 111. The back frame 13 is composed of a first support 131 foldably connected to a distal end of the base frame 11 and a second support 132 foldably connected to a distal end of the first support 131. The first support 131 consists of a pair of oppositely located first support frames 1311 and the second support 132 consists of a pair of oppositely located second support frames 1312. Preferably, the side plate 111 is made of a steel or iron having a bending stress larger than 200 Mpa, or a nylon material with or larger than 25% fiber glass, or Polyamide (PA)+Acrylonitrile Butadiene Styrene (ABS) compound material, or a carbonated fiber material or an alloy of aluminum and magnesium, or a titanium alloy or a magnesium alloy.

Figure 4:
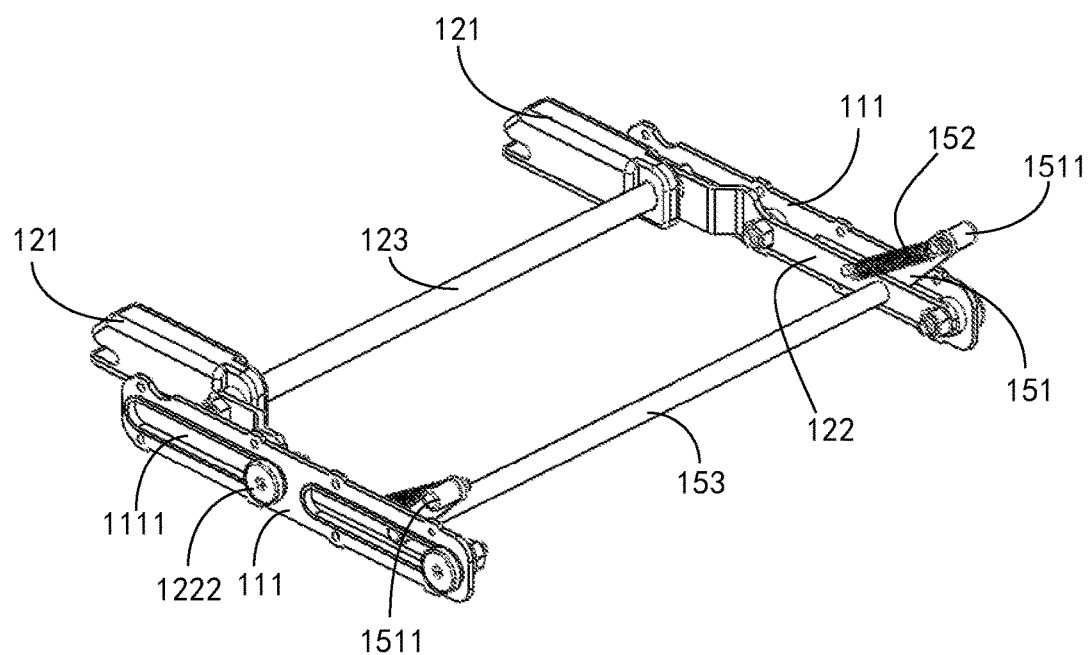
FIG. 4 is a perspective view of the base frame together with a sliding frame movably attached to an inside of the base frame.
Figure 5:
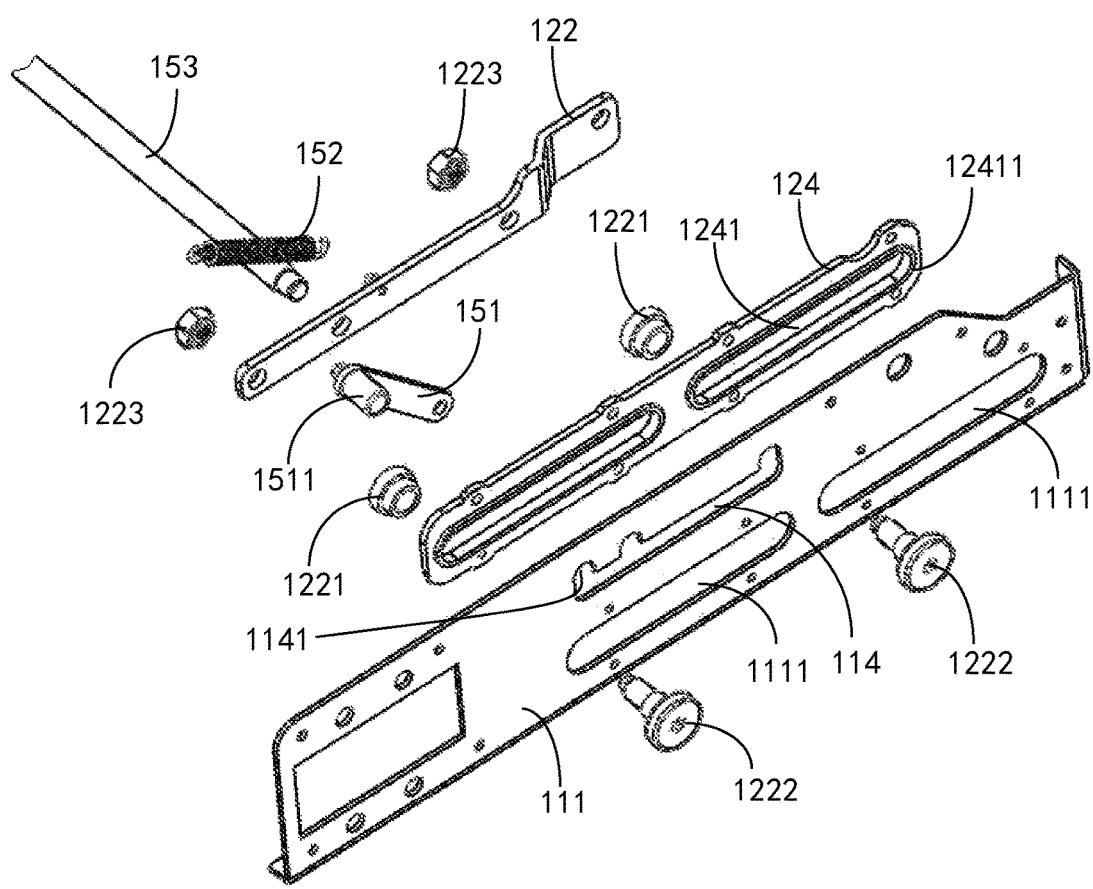
FIG. 5 is an exploded perspective view structural relationship between the base frame and the sliding frame.

With reference to FIGS. 3, 4 and 5, a sliding frame is provided inside the pair of first side plates 111 of the base frame 11 and has a pair of sliders 122 slidably connected to an inside of each of the pair of first side plates 111. Both the sliders 122 are, preferably, elongate in shape and have substantially the same structure. Thus, for brevity, the following description will focus on the detailed structure of the one slider 122 as well as the relationship between the one slider 122 and the side plate 111 of the base frame 11. It is appreciated that the first side plate 111 defines there through first bores 1111, preferably elongated in shape. The slider 122 includes a body, a pair of first stops 1221 securely mounted on or attached to a side face of the body and respectively having a centrally defined through hole (not numbered), a pair of bolts 1222 extendable through the first bores 1111 of the side plate 111 of the base frame 11 and a pair of nuts 1223 securely and threadingly attached to the bolts 1512 after the pair of bolts 1222 are extended through the first bores 1111, the centrally defined through hole of the first stops 1221 and the slider 122. It is understandable that even the bolts 1222 are securely and threadingly attached to the nuts 1223, the sliders 122 are still able to slide relative to both of the side plates 111 with the assistance of the pair of first stops 1221 partially received within the first bores 1111 to limit extent of movement of the slider 122 relative to the side plate 111. Furthermore, to synchronize the movement of both of the sliders 122, an auxiliary rod 153 may be employed to have secure engagement with each of the sliders 122 respectively. With such an arrangement and the help from the auxiliary rod 153, the movement of both of the sliders 122 is thus synchronized. Furthermore, in order to selectively secure the location of the sliders 122, a locking mechanism is provided to the sliders 122 so that whenever the sliders 122 are moved manually or with the help of electricity to an angle where the passenger feels comfortable, the locations of both of the sliders 122 may be locked to provide a pleasant seating comfort to the passenger. The locking mechanism includes a lever 151 whose first distal free end is pivotally connected or attached to a side face of each of the sliders 122 and whose second distal free end extends out of the side face of each of the sliders 122 and is provided with a knob 1511 for facilitating maneuvering movement of the lever 151 by an operator. The locking mechanism also has a spring 152 whose first distal end is securely attached to a side face of each of the sliders 122 and whose second distal end is securely connected to a rear side face of the lever 151 to provide the knob 1511 an upward push to constantly maintain the knob 1511 in a high up position. A limiting track 114 defined through the side face of each of the side plates 111 is also included in the locking mechanism and has multiple position cutouts 1141 defined in a periphery defining the limiting track 114 to correspond to the knob 1511 of the lever 151. Thus, when the knob 1511 is received in one of the position cutouts 1141, the spring 152 provides a push to the lever 151 to maintain the knob 1511 within the position cutout 1141 and, therefore, position of both of the sliders 122 is secured. When adjustment of the sliders 122 is required, the operator may depress the lever 1511 to lower the lever 151, the knob 1511 then escapes from the one of the position cutout 1141 and the sliders 122 are able to move freely along the first bores 1111 until the knob 1511 is received in a different position cutout 1141 after the operator releases the lever 151.

It is noted from the common knowledge that both the sliders 122 and the first side plate 111 are made of metal and friction therebetween will gradually damage side faces of each of the sliders 122 and the side plates 111. In order to decrease the friction therebetween, a pad frame 124, preferably made of rubber, is provided between the slider 122 and the corresponding side plate 111 and has second bores 1241 defined there through to correspond to the first bores 1111 of the side plate 111 and a flange 12411 formed on a periphery defining each of the second bores 1241 and extending into a corresponding one of the first bores 1111 of the side plate 111. As the shape and location of each of the second bores 1241 correspond to those of the first bores 1111 of the side plate 111, the first stops 1221 easily extend through the second bores 1241 as well as the first bores 1111 to mate with the bolts 1222.

Figure 6:
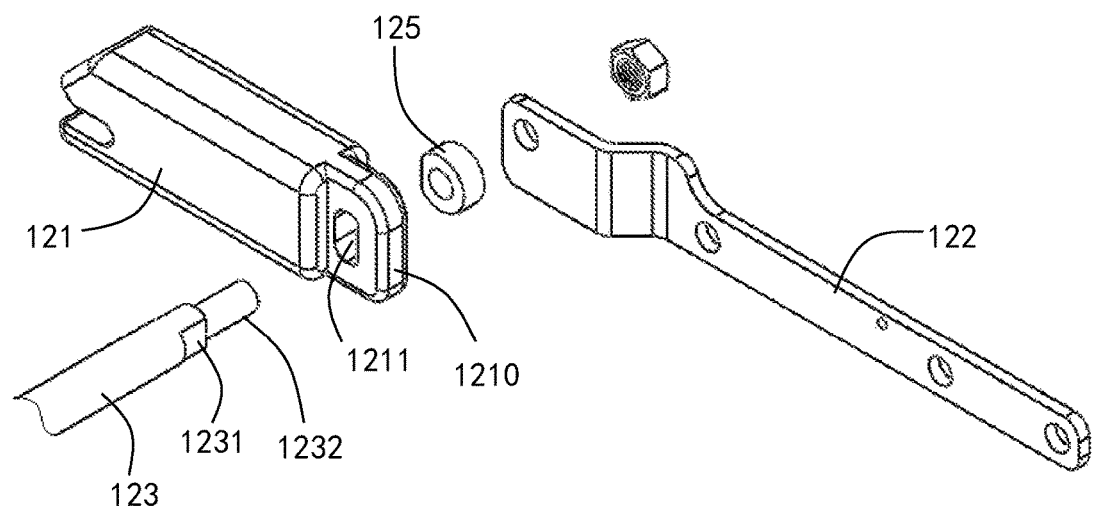
FIG. 6 is still an exploded perspective view showing how the sliding frame is connected to an adapter.
Figure 7:
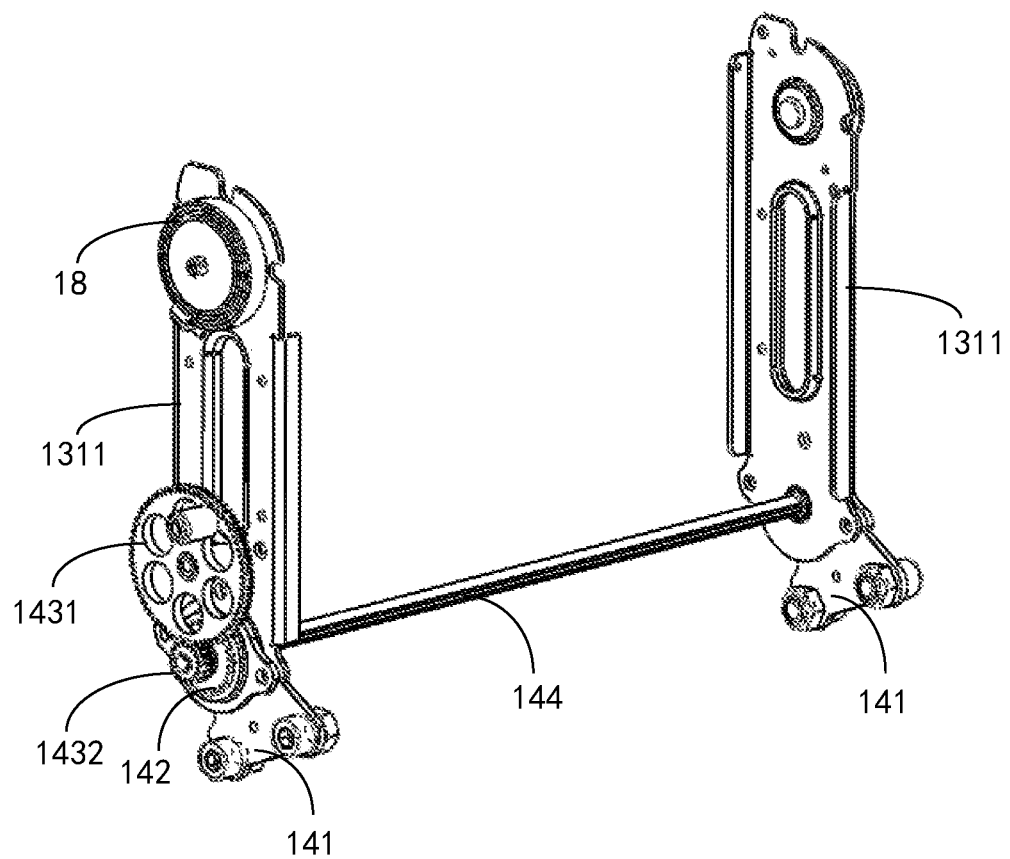
FIG. 7 is a schematic view showing the relationship between the first folding device and the first support frame of the back frame of the preferred embodiment of the present invention.
Figure 8:
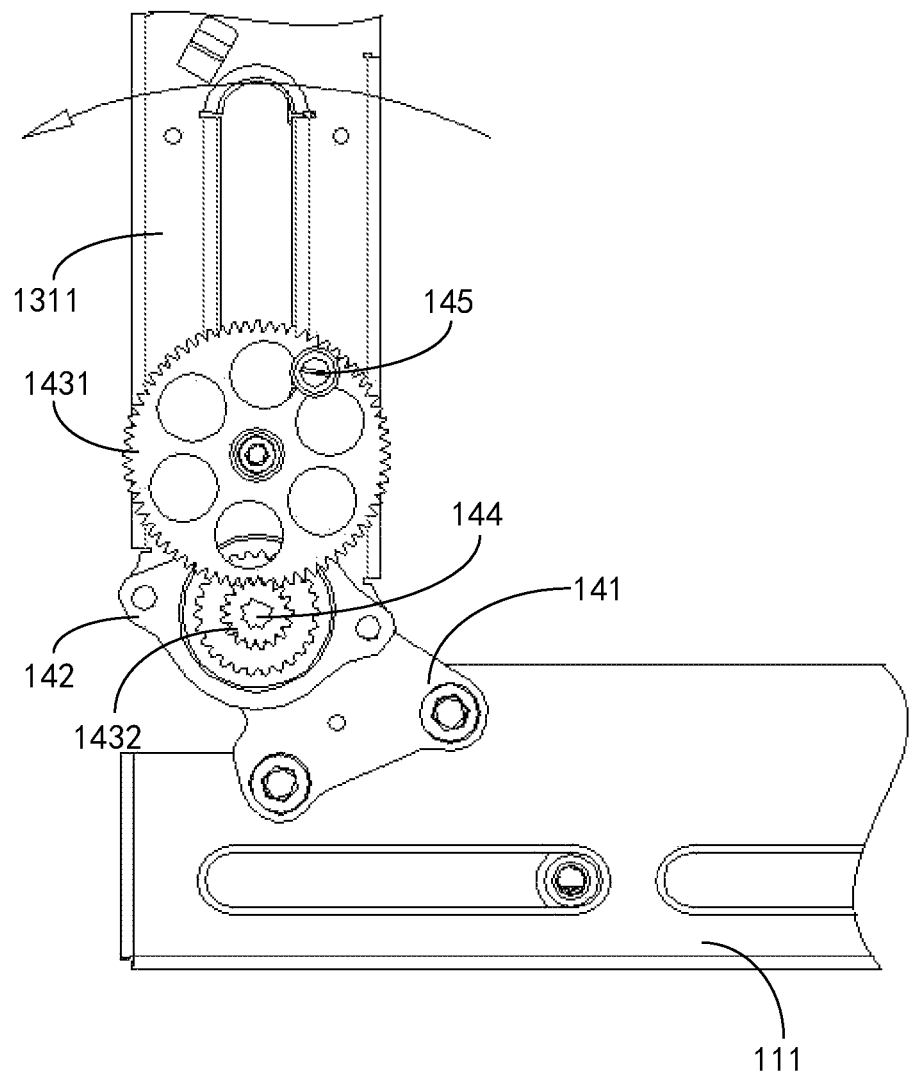
FIG. 8 is a schematic side plan view showing how the first folding device is sandwiched between the base frame and the first support frame of the preferred embodiment of the present invention.
Figure 9:
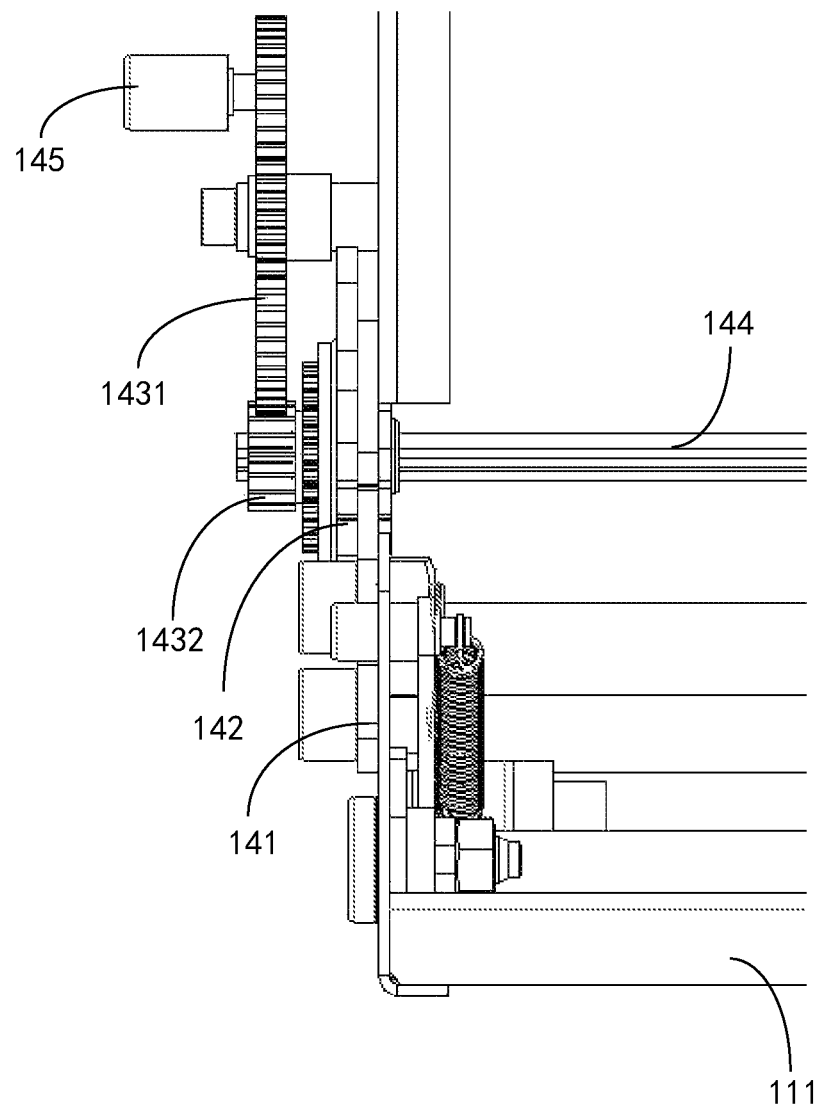
FIG. 9 is still a schematic side plan view of what is shown in FIG. 8.
Figure 10:
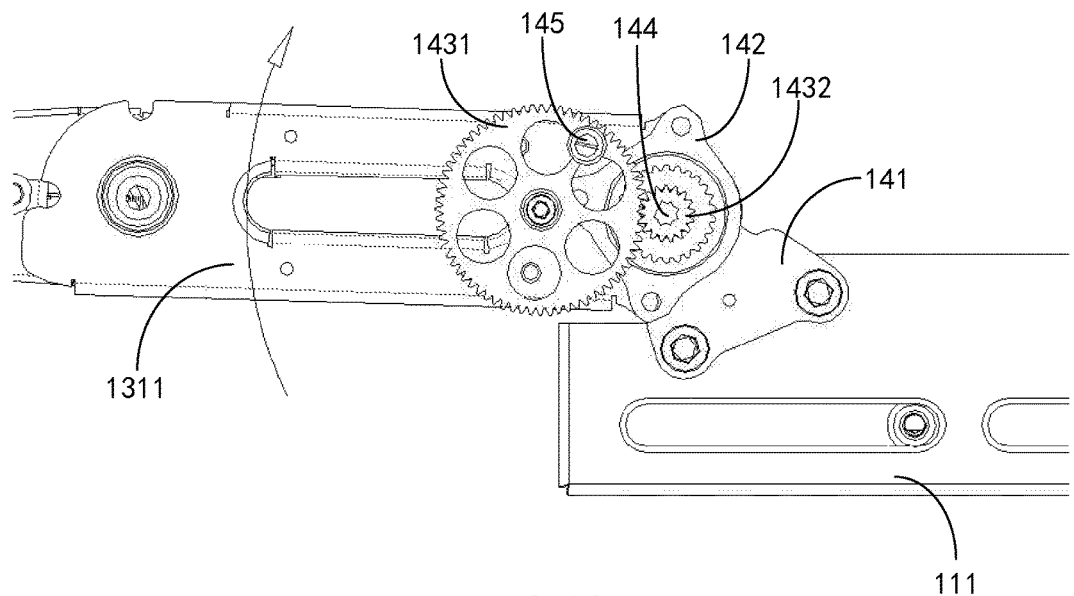
FIG. 10 is a schematic side plan view showing the first support frame is in parallel relative to the base frame due to the operation of the first folding device.

With reference to FIG. 6, to increase the adaptability of the car seat of the preferred embodiment of the present invention with the vehicle's original seat, an adapter device 12 is provided to a distal free end of each of the sliders 122. With reference to FIG. 6 and still taking FIG. 1 for reference, the adapter device 12 includes an adapter 121 securely attached to the distal free end of each of the sliders 122 for connection to the vehicle's original seat and a second connection rod 123 sandwiched between the two adapters 121. Each of the adapter 121 has a connection plate 1210 formed on a distal end of the adapter 121 and having a through hole 1211 defined through the connection plate 1210. A respective distal end, e.g., two distal ends, of the second connection rod 123 has a circumferential cutout 1231 and a cylindrical extension 1232, preferably a threaded one, extending out there from. After the cylindrical extension 1232 extends through the through hole 1211 as well as a hole (not numbered) in each of the sliders 122, a nut (not numbered) is employed to secure engagement of the second connection rod 123 with the adapter 121 as well as the slider 122. A cushion 125 made of a soft material, such as rubber, is placed between the connection plate 1210 and the slider 122 to provide a slight lateral shift to the adapter 121 in order to adjust the position of the adapter 121 to mate with the vehicle's seat.

With reference to FIGS. 7, 8, 9 and 10, a first folding device 14 is provided between the base frame 11 and the first support frame 131 to allow the first support frame 131 to fold relative to the base frame 11. The first folding device 14 is provided to both sides of the base frame 11 and located between the first side plate 111 and each of the first support frames 1311. The first folding device 14 has a first adjusting plate 141 securely attached to a side face of the first side plate 111 and having a first gear set (not numbered) securely attached to a side face of the first adjusting plate 141 a second adjusting plate 142 securely attached to a side face of the first support frame 1311 and having a second gear set securely yet rotatably attached to a side face of the second adjusting plate 142 and mated with the first gear set of the first adjusting plate 141. The second adjusting plate 142 further has a sun gear 1431 rotatably mounted on a side face of the first support frame 1311 and a planetary gear 1432 mated with the sun gear 1431 and firmly connected to the second gear set, which allows the planetary gear 1432 to rotate and thus drives the sun gear 1431 to rotate. To facilitate the rotation of the sun gear 1431, a handle 145 is provided on a side face of the sun gear 1431 so that the operator is able to hold the handle 145 and rotates the sun gear 1431. While the sun gear 1431 is rotated, the first support frame 1311 is able to fold relative to the base frame 111. Still, in order to synchronize the movement of the two sets of sun gear-planetary gear, a driving rod 144 may be provided to extend through the planetary gear 1432. Thereafter, the rotation of the sun gear 1431 due to a force exerted thereon is able to drive the first support frame 1311 to fold.

Figure 11:
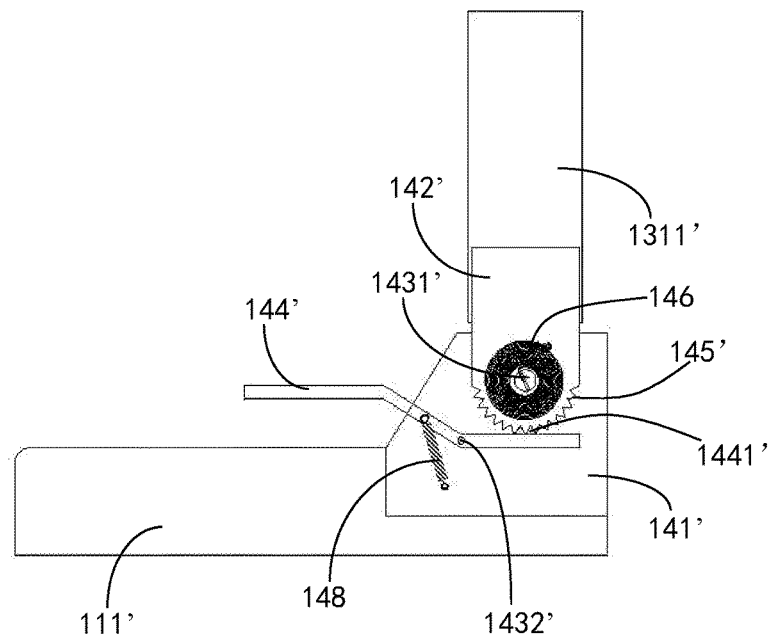
FIG. 11 is a schematic side plan view showing another embodiment of the first folding device between the first support frame and the base frame.
Figure 12:
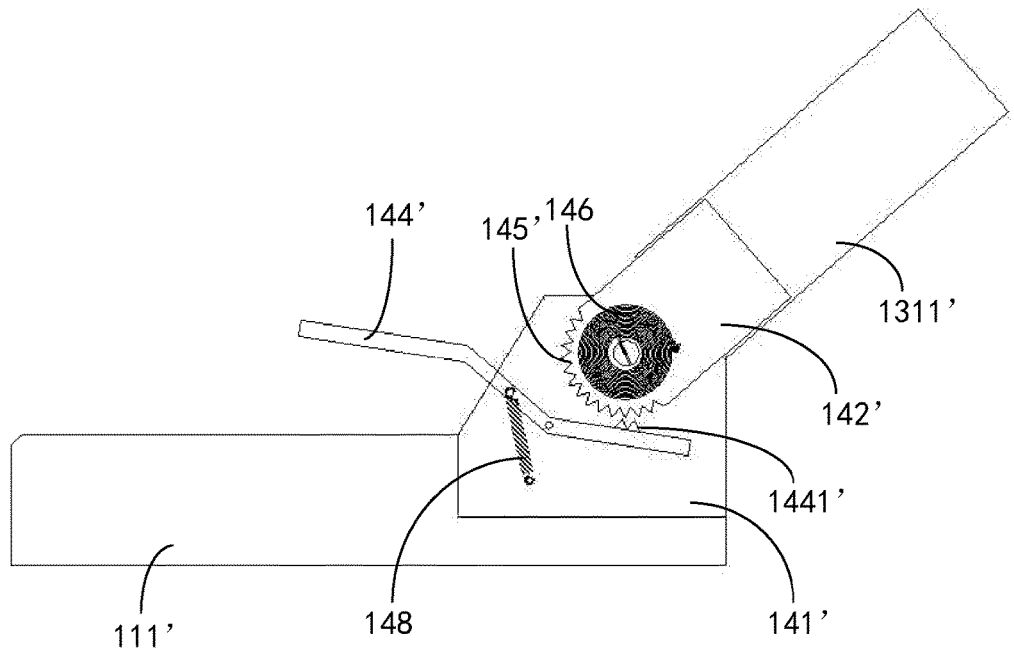
FIG. 12 is a schematic side plan view showing the movement of the first support frame relative to the base due to the first folding device.
Figure 13:
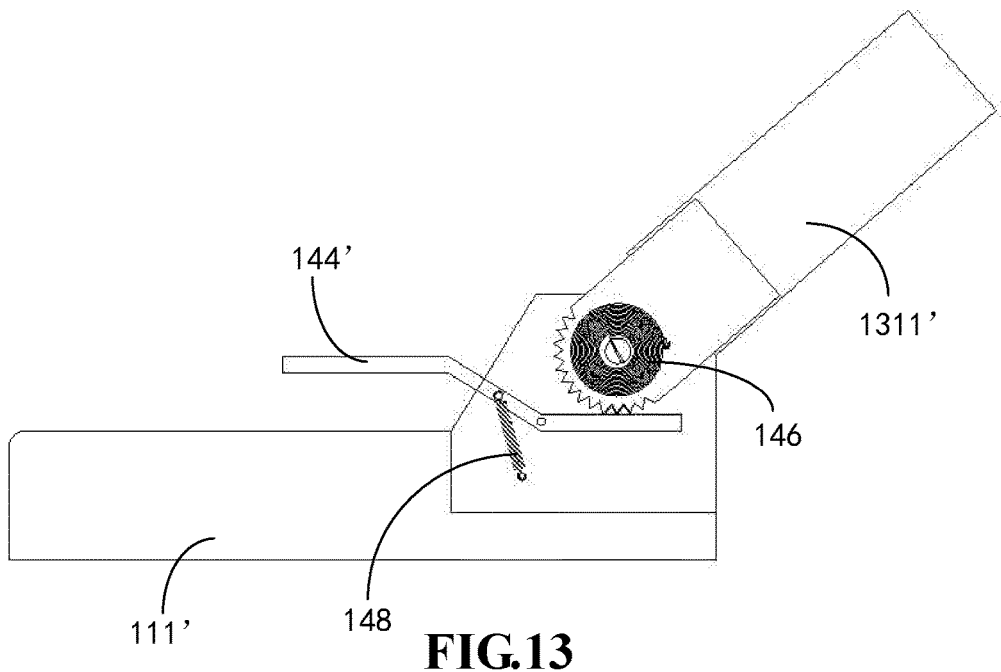
FIG. 13 is a schematic side plan view showing that the first support frame is locked by the first folding device.
Figure 14:
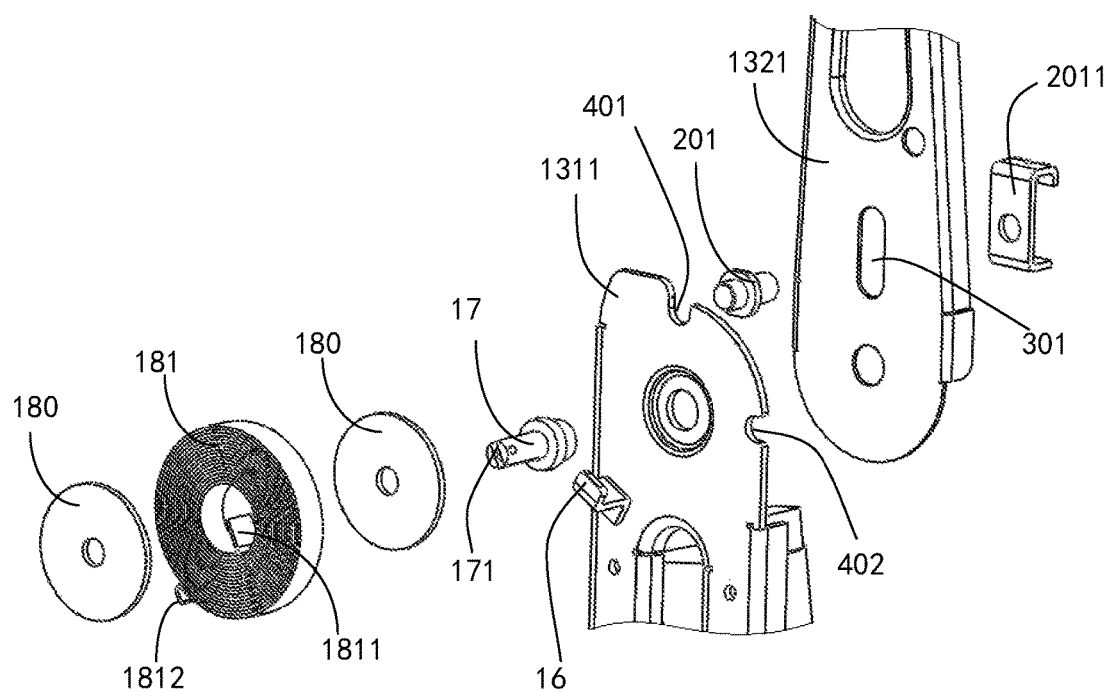
FIG. 14 is an exploded perspective view showing elements of the second folding device and relationship with the back frame.
Figure 15:
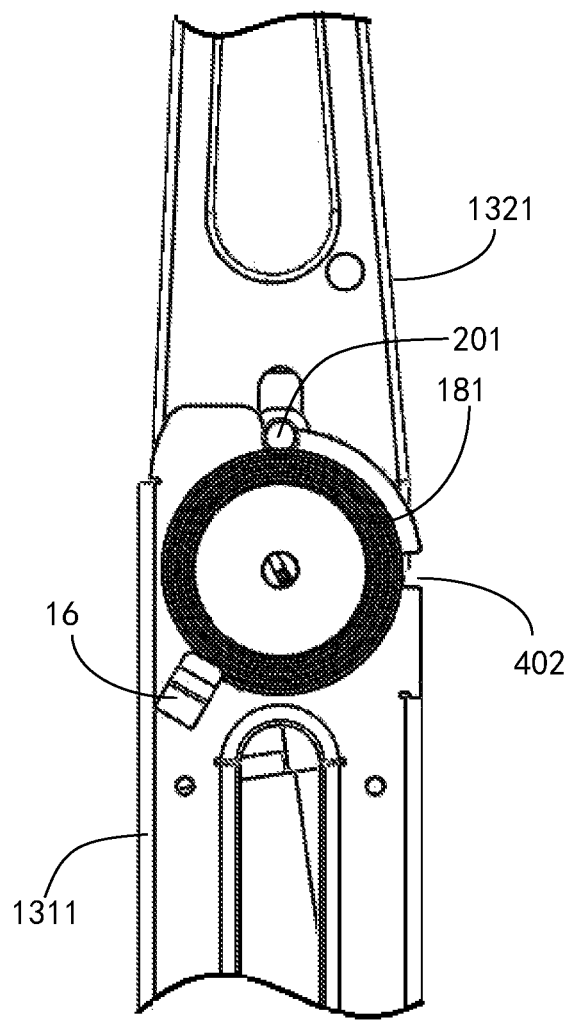
FIG. 15 is a schematic side plan view indicating how the second folding device is mounted onto the back frame.
Figure 16:
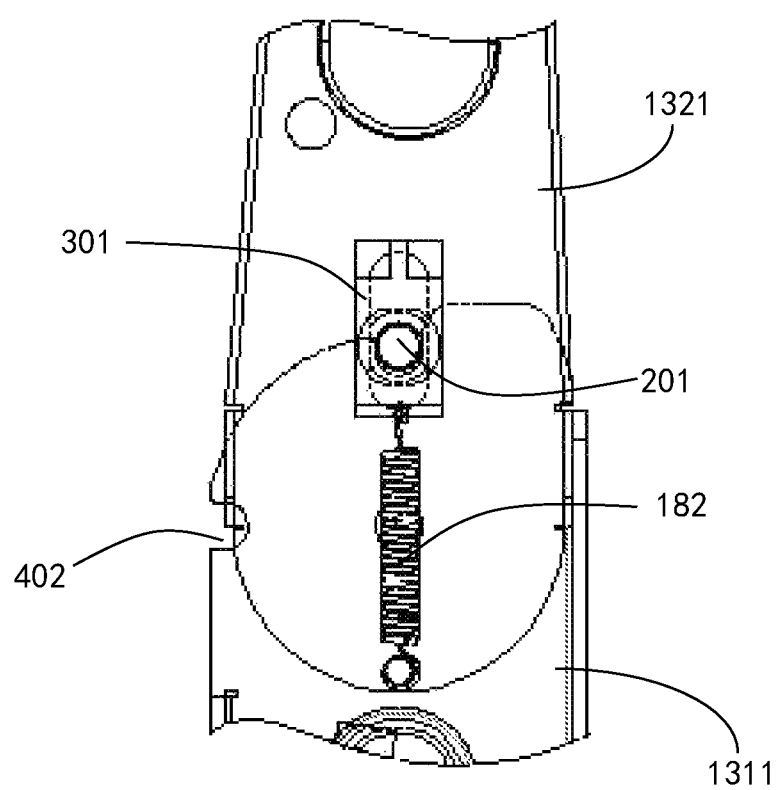
FIG. 16 is a schematic side plan view showing a leaf spring is provided to an inner side of the back frame.
Figure 17:
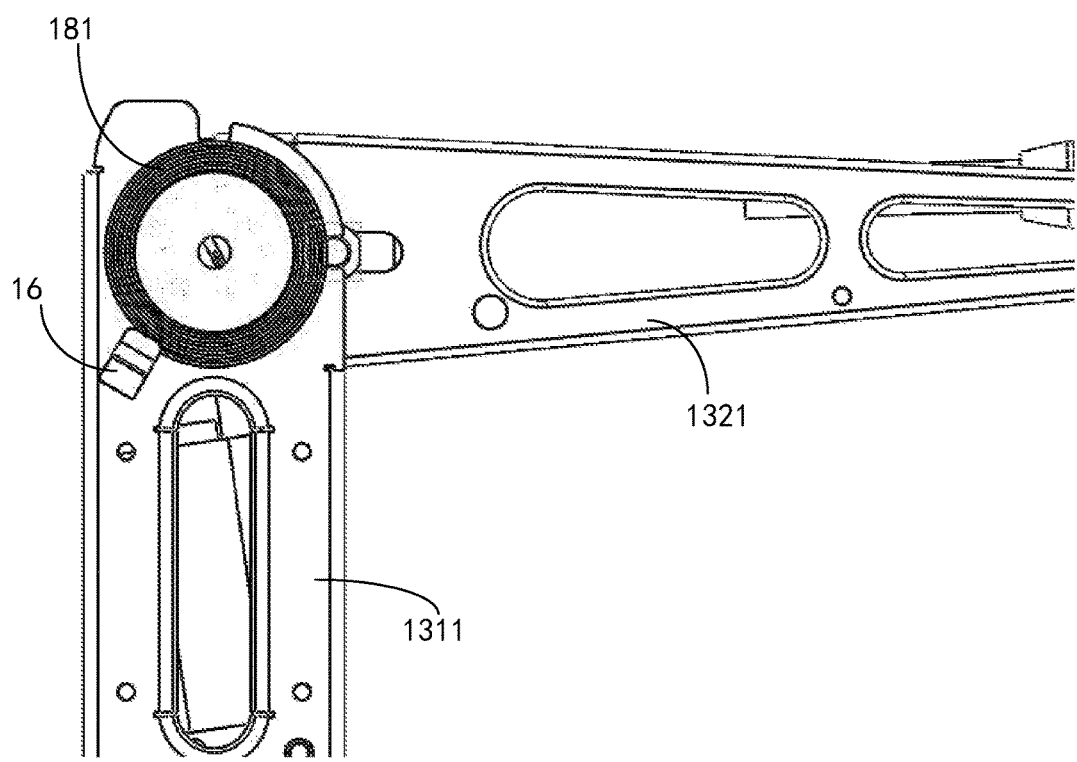
FIG. 17 is a schematic side plan view showing how the second folding device operates when the second support frame is folded relative to the first support frame.
Figure 18:
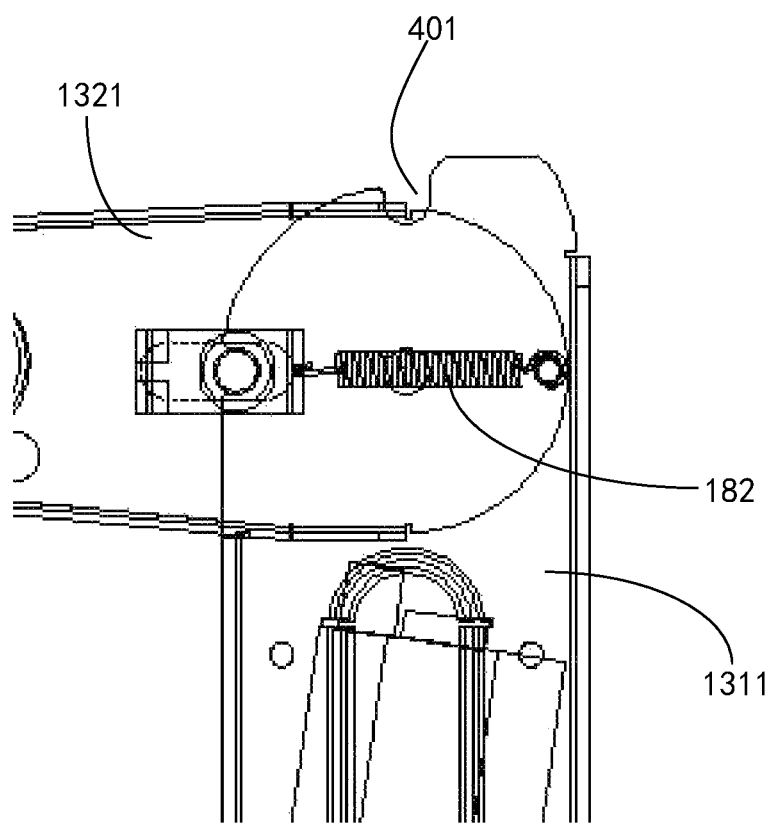
FIG. 18 is a schematic side plan view showing how the leaf spring operates when the second support frame is folded relative to the first support frame.

With reference to FIGS. 11, 12 and 13, a different embodiment of the first folding device 14' is shown, wherein the first folding device 14' constructed in accordance with the preferred embodiment of the present invention includes a first adjusting plate 141' securely attached to a side face of the first side plate 111' of the base plate, a second adjusting plate 142' securely mounted at a free end of the first support frame 1311' yet rotatably mounted on a side face of the first adjusting plate 141' through a first pivot axis 1431' and having ratchet 145' formed on a distal free end of the second adjusting plate 142', a first spring 146 whose first end is securely connected to the first pivot axis 1431' and second end is securely connected to a side face of the second adjusting plate 142' to allow the first spring 146 to provide a recovery force to the first support frame 1311' when the first support frame 1311' is moved, i.e., pivoted or rotated, relative to the first side plate 111' of the base frame, a limiting lever 144' pivotally mounted on the first adjusting plate 141' via a second pivot axis 1432' which is securely provided on a side face of the first adjusting plate 141' and a second spring 148 whose first end is securely connected to a side face of the limiting lever 144' and second end is securely attached to a side face of the first adjusting plate 141'. The limiting lever 144' is provided with a series of limiting teeth 1441' formed on a free end face of the limiting lever 144' and corresponding to the ratchet 145' of the second adjusting plate 142'.

It is appreciated that the second spring 148 provides a force to maintain one end of the limiting lever 144' in a low position and the other end of the limiting lever 144' in a high position. With this arrangement, the free end face with the limiting teeth 1441' is in constant contact with the ratchet 145', which stops the first support frame 1311' from movement relative to the first side plate 111'. However, when the free end of the limiting lever 144' is lifted to free the engagement between the limiting teeth 1441' and the ratchet 145', the first support frame 1311' is able to move freely relative to the first side plate 111', which achieves the goal of adjusting the angle of the back frame relative to the base frame.

With reference to FIGS. 14 to 18 and still taking FIG. 1 as reference, as described earlier, there is provided with a second folding device 18 between the first support 131 and the second support 132, which allows the second support frame 132 to fold relative to the first support frame 131. To be more precise, the second folding device 18 is sandwiched between a pair of horizontally situated first support frames 1311 and a pair of horizontally situated second support frames 1321. Here, to avoid any possible confusing and misunderstanding resulted from overly describing repeated elements, only the second folding device 18 attached between one side of the first support frame 1311 and the second support frame 1321 is described.

The second folding device 18 includes a first cutout 401 defined in a top periphery of the first support frame 1311, a second cutout 402 defined in a side periphery of the first support frame 1311 and a positioning stop 16 formed on a side face of the first support frame 1311. Furthermore, it is to be noted that the second folding device 18 also has a first joint 17 extending through the first support frame 1311 and into the second support frame 1321 to allow the second support frame 1321 to pivot relative to the first support frame 1311 and having a slit 171 defined in a distal end thereof and a second spring 181, preferably a coil spring, having a first end 1811 securely rested in the slit 171 and a second end 1812 securely rested on the positioning stop 16. In order to protect the user from being hurt by the second spring 181, a cap 180 is provided to cover or enclose the entire first spring 181. From the accompanying drawings, it is appreciated that the second spring 181 of the second folding device 18 is provided on the outside of the first support frame 1311. Opposite to the location of the second spring 181, a third spring 182, preferably a leaf spring, is provided on the inside of the first support frame 1311 and has a first end securely attached to an inner side face of the first support frame 1311 and a second end provided with a limit 201 formed thereon. To accommodate the limit 201, a limit hole 301 is defined through a side face of the second support frame 1321 so that the limit 201 is able to slide within the limit hole 301.

It is noted that when the first support frame 1311 and the second support frame 1321 is in parallel relative to each other, the second spring 181 is tension free with the second end securely rested on the positioning stop 16 and the limit 201 inside the limit hole 301 rested inside the first cutout 401, a first position. However, before the second support frame 1321 is folded relative to the first support frame 1311 and an angle of 90 degree(s) between the second support frame 1321 and the first support frame 1311 is expected, the limit 201 is lifted away from the first cutout 401 to allow the second support frame 1321 to pivot relative to the first support frame 1311. When the angle of 90 degree(s) between the first support frame 1311 and the second support frame 1321 is reached, it is observed that the limit 201 is now shifted to the second cutout 402. After the limit 201 is securely rested inside the second cutout 402 due to the tension from the second spring 182, relative position of the second support frame 1321 to the first support frame 1311 is fixed and the folded car seat is shown in FIG. 2. In order to readily facilitate movement of the limit 201, a lifter 2011 may be provided to the limit 201. The lifter 2011 may be integrally formed on the limit 201 or may be detachably yet firmly connected to the limit 201. The technique involved to form the lifter 2011 on the limit 201 or to detachably yet firmly connect the lifter 2011 to the limit 201 is well known in the art and no detailed description thereof is provided for clarity and concise.

To increase comfort, a pillow mount 50 is provided on top of the foldable car seat and has a top beam 133 mounted on free ends of both the third support frame 1321 and the fourth support frame 1322 and a lower beam 134 mounted at a middle portion of both the third support frame 1321 and the fourth support frame 1322.

Although the invention has been described in connection with the embodiments shown in the accompanying drawings, a person having ordinary skill in the art can make various modifications to the invention based on the above descriptions. Therefore, some details of the embodiment should not be construed to restrict the invention. The scope of the invention is limited by the accompanying claims.

What is claimed is:

1. A foldable car seat adapted to connect to a vehicle seat, the foldable car seat comprising a base frame, a sliding frame slidably attached to an inside of the base frame and having an adapter securely attached to a free end of the sliding frame to adapt to the vehicle seat so that the base frame is able to move relative to the sliding frame, and a back frame foldably connected to the base frame and consisting of a lower support frame foldably connected to free ends of the base frame through a first folding device to allow the lower support frame to fold relative to the base frame and an upper support frame foldably connected to free ends of the lower support frame through a second folding device to allow the upper support frame to fold relative to the lower support frame, wherein improvements comprise:
   a locking mechanism provided to the sliding frame to limit movement extent of as well as to position location of the sliding frame relative to the base frame,
      wherein the base frame further comprises a pair of horizontally located first side plates each having at least one bore defined through a side face thereof, and
      the sliding frame has a pair of sliders respectively and slidably attached to a side face of each of the horizontally located first side plates and having at least one stop formed on a side face thereof and movably received in the at least one bore of the first side plates to limit movement extent of the sliders relative to the sliders,
      the locking mechanism has a lever whose first end is pivotally connected to a side face of a respective one of the pair of sliders and second end is provided with a knob, a limiting track adapted to be defined in the side face of each one of the pair of the first side plates to receive therein the knob and position cutouts defined in a periphery defining the limiting track to selectively receive therein the knob of the lever so as to position location of the pair of sliders relative to the pair of first side plates of the base frame.

2. The foldable car seat as claimed in claim 1, wherein the lower support frame includes a pair of first support frames foldably connected to distal ends of the first side plates, the first folding device is located at a joint between each of the first support frames and each of the first side plates so that both of the first support frames are able to fold simultaneously relative to the base frame due to a driving rod sandwiched between the pair of first support frames and extending into the first folding device to synchronize movement of the first folding device on both sides of the pair of the back frame.

3. The foldable car seat as claimed in claim 2, wherein the first folding device includes a first adjusting plate securely attached to the first side plate, a second adjusting plate securely attached to the first support frame yet rotatably connected to the first adjusting plate, a sun gear rotatably mounted on a side face of the first support frame and a planetary gear mated with the sun gear and firmly connected to the driving rod, and a handle provided on a side face of the sun gear to facilitate rotation of the first support frame so that the first support frame is foldable relative to the first side plate.

4. The foldable car seat as claimed in claim 2, wherein the first folding device includes a first adjusting plate securely attached to the first side plate, a second adjusting plate securely attached to the first support frame yet rotatably connected to the first adjusting plate via a first pivot axis and having a ratchet formed on a free end of the second adjusting plate, a first spring whose first end is securely connected to a side face of the first support frame and second end is securely connected to a side face of the second adjusting plate to provide a recoil force to the first support frame after the first support frame is moved relative to the first side plate, and a limiting lever pivotally connected to the first adjusting plate and having a limiting teeth formed to selectively mate with the ratchet of the second adjusting plate so that when the ratchet is mated with the limiting teeth, the first support frame is stopped from movement and when the limiting teeth is disconnected to the ratchet, the first support frame is free to move relative to the first adjusting plate.

5. The foldable car seat as claimed in claim 4, wherein a second spring is provided to provide to a side face of the limiting lever and a side face of the first adjusting plate such that a recovery force is provided to the limiting lever after the limiting lever is moved.

6. The foldable car seat as claimed in claim 1, wherein the second folding device includes a joint respectively inserted between each of the first support frames and each of the second support frame to allow the second support frame to pivot relative to the first support frame,
   a spring having a first end securely rested in a free end of the joint and a second end securely attached to a side face of the first support frame so that when the second support frame is parallel relative to the first support frame, the spring is tension free and when the second support frame is vertical relative to the first support frame, the first spring is tensioned,
   a first cutout defined in a top periphery of the first support frame and a second cutout defined in a side periphery of the first support frame and a limit selectively located in the first cutout and the second cutout to respectively position the second support frame to be parallel or vertical relative to the first support frame,
   a second spring having a first end securely respectively attached to an inner side face of the second support frame and a second end securely attached to the limit to allow the limit to be retracted after the limit is moved.

7. The foldable car seat as claimed in claim 6 further comprising a pillow mount having a top beam mounted on free ends of both the second support frame and a lower beam mounted at a middle portion of both the second support frames.

8. The foldable car seat as claimed in claim 1, wherein the first side plate is made of a material selected from the group consisting of steel or iron having a bending stress larger than 200 Mpa, a nylon material with or larger than 25% fiber glass, Polyamide (PA)+Acrylonitrile Butadiene Styrene (ABS) compound material, a carbonated fiber material, an alloy of aluminum and magnesium, a titanium alloy and a magnesium alloy.

* * * * *